(12) United States Patent
Mathews (10) Patent No.: US 8,677,388 B2
(45) Date of Patent: Mar. 18, 2014

(54) METHOD AND SYSTEM FOR VERIFIABLE TWO-WAY COMMUNICATION AND INTERACTION WITH AUDIENCES USING MULTIPLE MEDIA FORMATS

(76) Inventor: Sunil Mathews, Rockville, MD (US)

( * ) Notice: Subject to any disclaimer, the term of this patent is extended or adjusted under 35 U.S.C. 154(b) by 0 days.

(21) Appl. No.: 13/423,920

(22) Filed: Mar. 19, 2012

(65) Prior Publication Data

US 2012/0240143 A1      Sep. 20, 2012

Related U.S. Application Data

(60) Provisional application No. 61/453,832, filed on Mar. 17, 2011.

(51) Int. Cl.
*H04N 7/16*     (2011.01)

(52) U.S. Cl.
USPC ............................. 725/14; 709/224

(58) Field of Classification Search
USPC ............................. 725/14–16, 34–36, 60–61; 709/217–232
See application file for complete search history.

(56) References Cited

U.S. PATENT DOCUMENTS 6,282,713 B1 *   8/2001   Kitsukawa et al. ............. 725/36
7,603,683 B2 *  10/2009   Reto ............................... 725/34

\* cited by examiner

*Primary Examiner* — Annan Shang
(74) *Attorney, Agent, or Firm* — Edell, Shapiro & Finnan, LLC (57) ABSTRACT

A system and method for verifiable two-way communication and interaction with audiences using Visual Cues and images to enable an audience, irrespective of size, to interact with multiple media formats, using smart devices such as smartphones and smart cameras. Allows interactions with viewers in real-time that will provide richer data that can be used to measure an audience more reliably.

5 Claims, 8 Drawing Sheets

Schematic of Visual Cue Insertion Process in Dynamic Media Environment

FIG. 5

Schematic of Visual Cue Insertion Process in Dynamic Online (non-video) Media Environment FIG. 6
Schematic of Visual Cue Insertion Process in Outdoor Media Environment FIG. 7
Schematic of Process Flow of Standalone Version of Device App FIG. 8
Schematic of Process Flow When Smart Device is Used

FIG. 9

Schematic of Supervisory & Image Processing Elements

METHOD AND SYSTEM FOR VERIFIABLE TWO-WAY COMMUNICATION AND INTERACTION WITH AUDIENCES USING MULTIPLE MEDIA FORMATS

PRIORITY CLAIM AND REFERENCE TO RELATED APPLICATION

This application claims priority to related, commonly owned U.S. provisional patent application No. 61/453,832, filed Mar. 17, 2011, the entire disclosure of which is incorporated herein by reference.

BACKGROUND OF THE INVENTION

1. Field of the Invention

The present invention relates to media Consumer or audience sampling, survey or measurement systems and methods.

2. Discussion of the Prior Art

Figure 1:
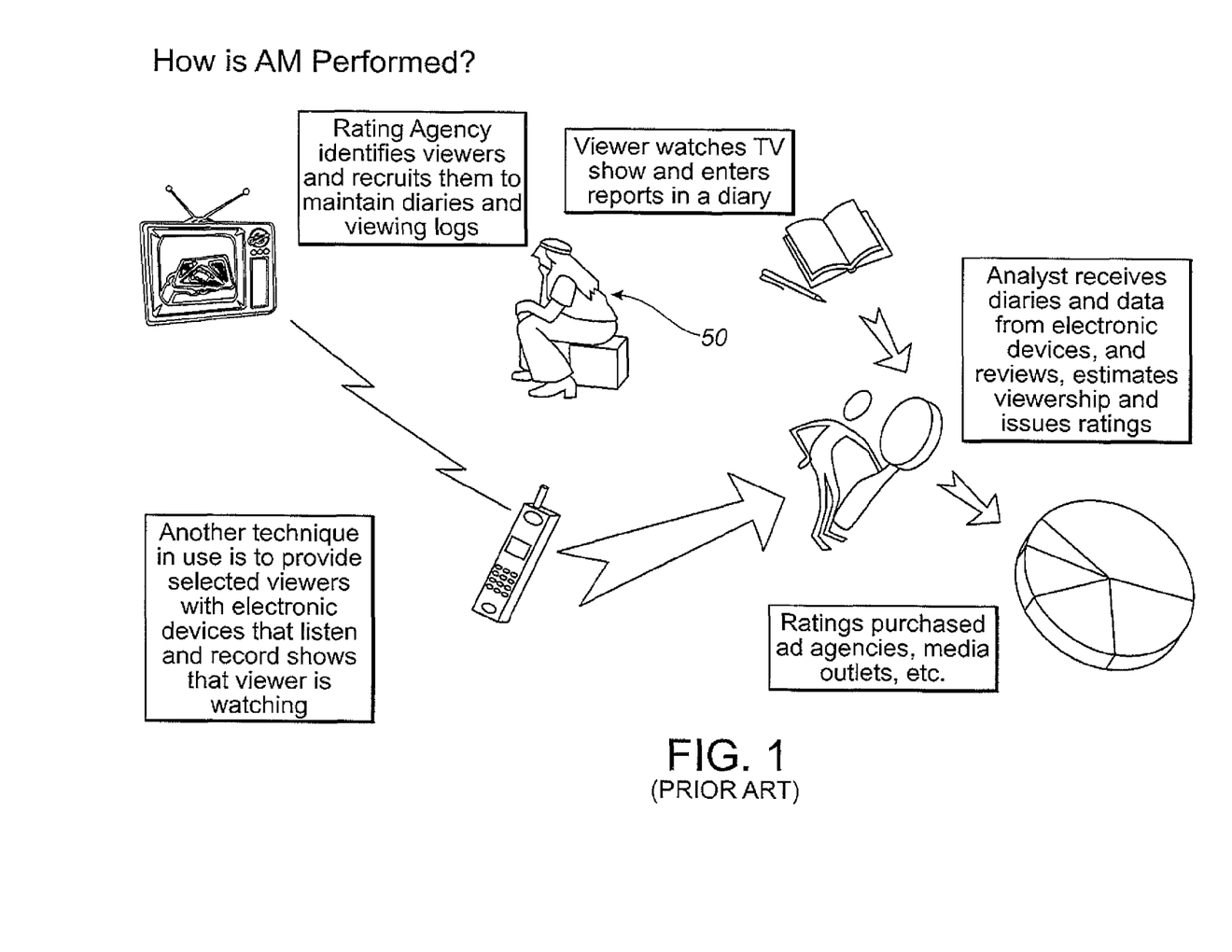
FIG. 1 illustrates the prior art methods for gathering Audience Measurement ("AM") metrics for broadcast and other media.

The Nielsen Company, Arbitron and others have long sought for improved methods for measuring audiences for broadcast television other media platforms and services. Audience measurements of media, such as television or radio programs, are typically carried out by monitoring or measuring media consumption (e.g., the viewing of or listening to audio/video content) within households that are statistically selected to represent particular demographic groups, geographic regions, etc, as shown in FIG. 1.

Using various statistical methods, the collected media consumption data may be processed to determine audience size and demographics for media presentations or programs of interest. Such audience size and demographic information may be valuable to advertisers, broadcasters and any other media delivery entity or service provider that wants to know an audience size and demographic associated with a particular program. For example, audience size and demographic information is a significant factor in the development of improved program lineups, the placement of advertisements targeted at a particular demographic, as well as in valuing commercial time slots during particular programs.

Audiences are increasingly using more than one type of media device or platform configured to display or play back more than one type of media format. Thus, audiences can interact with multiple media formats—TV (e.g., conventional, cable, satellite, Internet Protocol TV (IPTV)), online content (e.g., web browsing, searching, etc., except video), content adapted for playback or display on PDAs and cell phones, print media and outdoor ads, and conventional radio. These multiple media formats can be classified into three primary groups—video (including IPTV), online (excluding video) and outdoor media. These multiple media formats—TV (conventional, cable, satellite, Internet Protocol TV (IPTV)), online (web browsing, searching, etc., except video), cell phone, print, and outdoor ads, except conventional radio—will be collectively referred to as "Media".

The prior art audience measurement methods and systems do not meet everyone's need, though. Media producers, broadcasters, advertisers, marketers and other stake holders are still seeking a method or system which can provide timely verification or confirmation that a selected audience has been reached and retained.

There is a need, therefore, for a cost-effective system and method for gathering audience measurement data in a comprehensive manner, across multiple media formats that can be used to estimate audience measurement metrics with a higher degree of confidence than is possible using the prior art systems.

SUMMARY OF THE INVENTION

Accordingly, it is an object of the present invention to overcome the above mentioned difficulties by providing an effective, flexible, cost-effective and unobtrusive system and method for interactively gathering audience measurement data in a comprehensive manner, across multiple media formats or platforms. For purposes of nomenclature, media formats include but not limited to television, conventional television, satellite television, cable television, Internet Protocol TV, online (web browsing, searching, etc. except video), cellphone, print, and outdoor ads, except conventional radio). The data are used to estimate audience measurement metrics with a higher degree of confidence.

Another object of the method and system of the present invention is providing media producers, broadcasters, advertisers, marketers and other stake holders with a method and system for timely verification or confirmation that a selected audience has been reached and retained, on any of several media formats.

The present invention comprises a system and method for gathering Audience Measurement ("AM") data and Audience Participation ("AP") data in a timely, verifiable and comprehensive manner. Each participating Consumer or audience member uses or carries a smart phone (e.g., an iPhone® or Blackberry®) or similar transportable personal Device and is given access to a downloadable computer program or Device Application for use in a self-selection Audience Participation (AP) process such as a Consumer survey.

The Consumer is given access to media content such as a broadcast television program developed by the Program's producer or an advertiser (Client or customer). That program or media content is broadcast or displayed with at least one unique, pre-defined Visual Cue Management symbol or Visual Cue ("VQ" or "Midy") which incorporates an encoded graphic element with encrypted identification information. The Visual Cue has a pre-defined two dimensional configuration or shape (e.g., a circle) and the interior of the Visual Cue contains a plurality of subdivided areas or graphical data fields which are encoded or encrypted with regions having a selected color, pattern or other visible indicia adapted for optical sensor detection. The Visual Cue is packaged with select customer parameters, which have been obtained from the Client, including but not limited to display parameters (format, location, start time and duration). In the preferred embodiment, the Visual Cue is sized and configured for convenient use with optical sensors or digital cameras such as are customarily incorporated in smart phones, Personal Digital Assistants (PDAs) and other transportable personal Devices which are programmed with the system's downloadable Device Application.

In accordance with the present invention, a method and system for verifiable two-way communication and interaction with audiences who may be using one or more of a selected plurality of media formats or platforms includes four major elements, namely:

(a) Visual Cue Management (VCM) Software, for managing a plurality of unique visible indicia (i.e., "Visual Cues" or "VQs") which function much like digital fingerprints and so uniquely identify a particular segment of media programming and a particular media producer, broadcaster, advertiser, marketer or other stake holders ("Clients") for the time and duration or Selected Visual Cue Display Interval specified by customer parameters, (b) a Device Application (referred to as an "App") residing on an individual Consumer's transportable smart Device (e.g., a smart phone equipped with GPS and a digital camera), (c) a Supervisory Program (SP): to manage flow of data to and from external sources—Clients and Consumers—and functions such as a decoding, data parsing, VCM, Database Management System (DBMS), Visual Cue Image Validation, etc., and (d) an Image Validation Program (IVP): to validate that Consumer images have at least one valid Visual Cue.

In the method of the present invention, from the Consumer's perspective, media content or programming such as an advertisement is shown on TV, and at a selected start time during the ad or a show a Visual Cue (VQ) appears for a Selected Visual Cue Display Interval in a selected position within the display area. For example, if the Client is a restaurant placing an ad in a newspaper, the Selected Visual Cue Display Interval may be one week or if the ad is shown on TV it may be for 30 seconds. Another example is if the Client is a realtor selling a home, the Selected Visual Cue may be one month. Another example is when the Client has an advertisement being shown regularly throughout the day via a publisher or broadcaster and the customer parameters accompanying the Visual Cue may indicate a Selected Visual Cue Display Interval that is a subset of the overall ad duration, specifically, the start time may be 5:30 pm and the Selected Visual Cue Display Interval is 30 minutes.

When the VQ appears, the Consumer makes a decision about whether to participate and, if so, the Consumer activates the previously downloaded Device App on the Consumer's Smartphone and points the Smartphone's camera or image sensor at the display including the VQ. The nomenclature "Smartphone" as used herein, should be construed to include the iPhone™, the Blackberry™, the Droid™ and any other of the popular, transportable data communication and display instruments now in common use, and their equivalents.

In response to the Consumer's decision to participate and Device App activation, the Consumer's Device App enables and initiates a set of programs or routines that activate the Smartphone's camera which detects, senses and then records or captures an image or snap-shot of the display or TV screen or display (while VQ is still visible). The Device App stores the captured image of the VQ along with a time and date stamp, preferably with information on the sensed GPS location of Consumer at the time the image was captured. The Device App collects the stored image data with the VQ data, the time and date stamp, and other Consumer-specific data entered by the Consumer or taken from memory on the Smartphone and assembles Audience Measurement ("AM") and Audience Participation ("AP") data into an AM-AP Consumer Input File adapted for digital transmission over a data communication network. For purposes of nomenclature, data communications network should be construed to include wired or wireless telecommunications networks, dedicated (e.g., Ethernet) data communications networks, the Worldwide Web or the Internet.

The Consumer's Smartphone or other portable Device may optionally be connected to a personal computer programmed to transmit the AM-AP Consumer Input File over the Internet via a wired or wireless connection to a remotely located Supervisory Program computer system programmed to receive and store many AM-AP Consumer Input Files from many users simultaneously. The Supervisory Program computer system continuously receives and processes AM-AP Consumer Input Files from a plurality of assigned Consumers, verifies the data in each AM-AP Consumer Input File and collates the data from all assigned Consumer as the AM-AP Consumer Input Files are received. In response to receiving the Consumer's AM-AP Consumer Input File, the Supervisory Program computer system generates a plurality of reports for use by Consumer and Clients including a Record of Consumer's incentives for each Consumer assigned to a given Supervisory Program computer system and an aggregate report for all of the Consumers assigned to that Supervisory Program computer system. Each Supervisory Program computer system also generates a Record of Consumer's behaviors or selections, and this data is collated for each Consumer assigned to the Supervisory Program computer system along with and an aggregate report for all of the Consumers assigned to that Supervisory Program computer system, for use by authorized Clients and, optionally, by selected authorized Consumers. If the Consumer's AM-AP Consumer Input File indicates that a customer response is required based on the Record of Consumer's Incentives, then the Supervisory Program responds accordingly.

In an alternative embodiment, there is only a single Supervisory Program and all Consumers are thus "assigned" to or aggregated within that single Supervisory Program's received Input files and reports.

The above and still further objects, features and advantages of the present invention will become apparent upon consideration of the following detailed description of a specific embodiment thereof, particularly when taken in conjunction with the accompanying drawings, wherein like reference numerals in the various figures are utilized to designate like components.

DESCRIPTION OF THE PREFERRED EMBODIMENT

Figure 2:
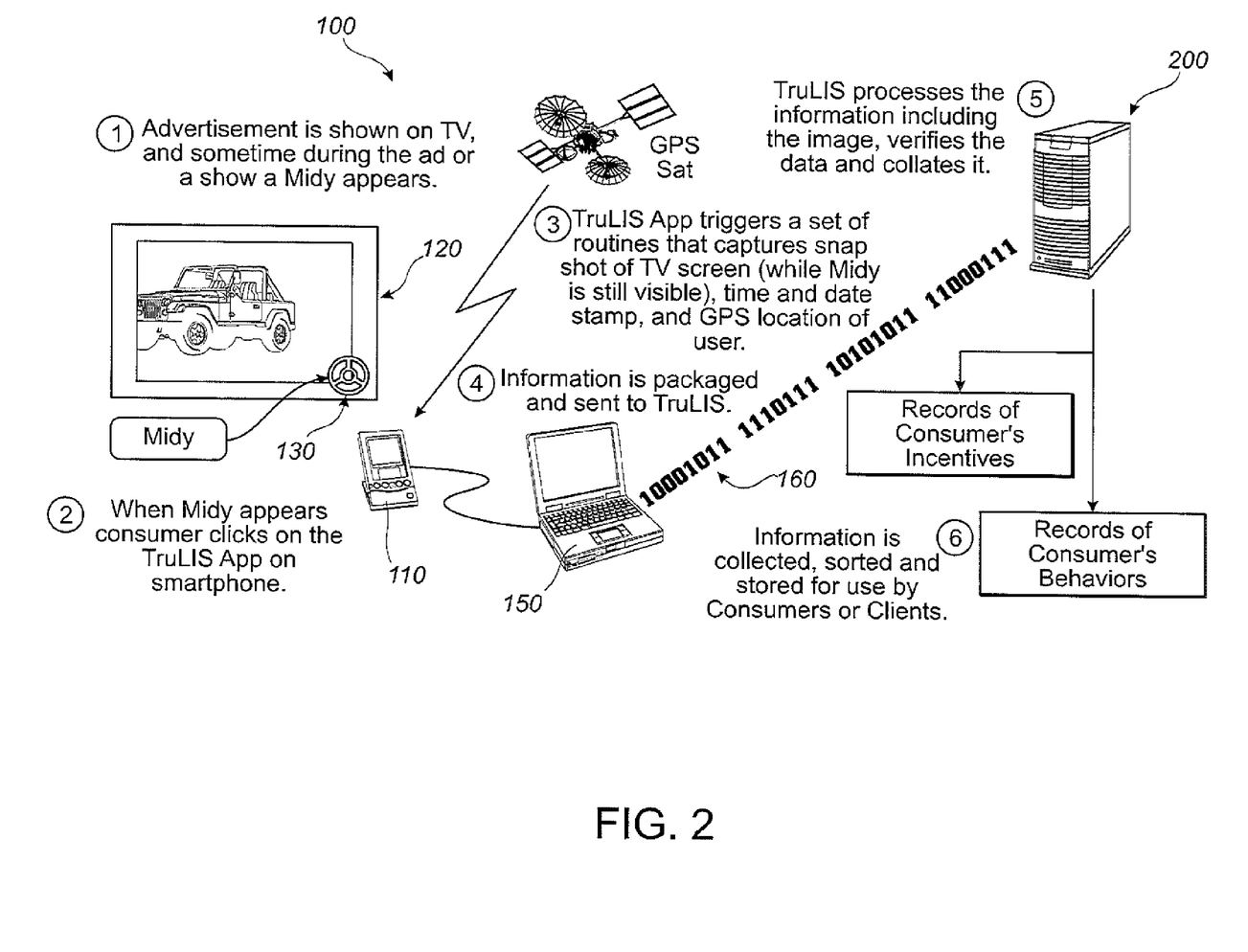
FIG. 2 illustrates a system and method for gathering AM data in a comprehensive manner, and providing audience member self-selection Audience Participation ("AP") data across multiple media formats or platforms for use in estimating AM and AP metrics with a higher degree of confidence, in accordance with the present invention.
Figure 3:
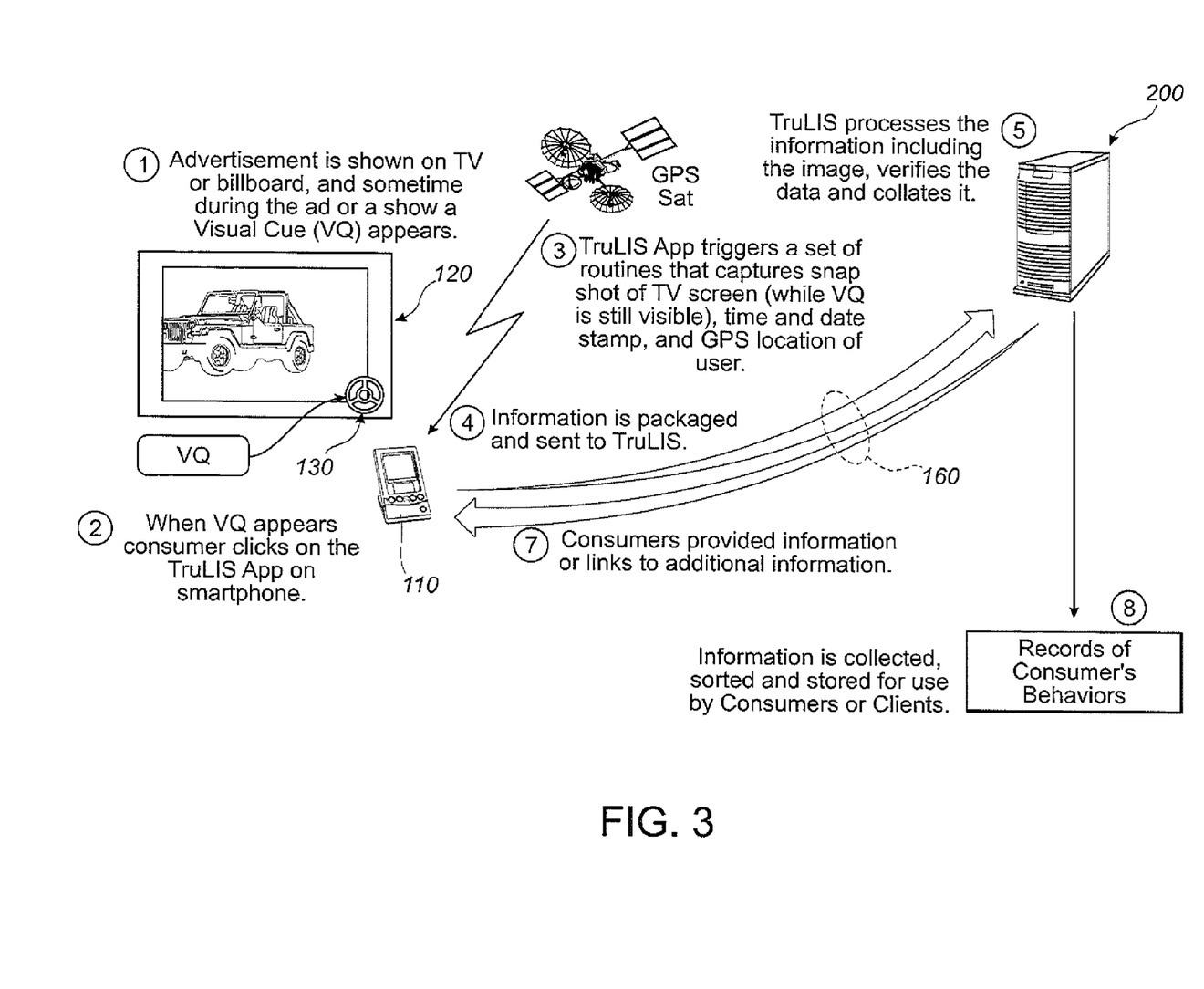
FIG. 3 also illustrates a system and method for gathering AM data in a comprehensive and interactive manner, and providing audience member self-selection AP data across multiple media formats or platforms for use in estimating AM and AP metrics with a higher degree of confidence, in accordance with the present invention.

Referring now to FIGS. 1, 2 and 3, the present invention comprises a system 100 and method for gathering Audience Measurement ("AM") and Audience Participation ("AP") data in a timely, verifiable and comprehensive manner. Each participating Consumer 50 or audience member carries a smart phone (e.g., an iPhone® or Blackberry®) or similar transportable personal Device 110 and is given access to a computer program or Device Application for use in a self-selection AP process such as a Consumer survey. As noted above, the nomenclature "Smartphone" as used herein, should be construed to include the iPhone™, the Blackberry™, the Droid™ and any other of the popular, transportable data communication and display instruments now in common use, and their equivalents.

The Consumer 50 is given access to media content such as a broadcast television program developed and broadcast or displayed by the Program's producer or an advertiser (the "Client"). That media content 120 is broadcast or displayed with at least one unique, pre-defined Visual Cue, VQ or "Midy" 130 which incorporates an encoded graphic element with encrypted identification information. The Visual Cue 130 has a pre-defined two dimensional shape (e.g., a circle, as shown in FIG. 2) and the interior of the Visual Cue 130 contains a plurality of subdivided areas or graphical data fields which are encoded or encrypted with regions having a selected color, pattern or other visible indicia adapted for optical sensor detection. In the preferred embodiment, the Visual Cue 130 is sized and configured for convenient use with optical sensors or digital cameras such as are customarily incorporated in smart phones, Personal Digital Assistants and other transportable personal Devices 110 which can be programmed with the system's downloadable Device Application as a commercial "App".

The method and system 100 for verifiable two-way communication and interaction with audiences who may be using one or more of a selected plurality of media formats or platforms includes four major elements, namely:

(a) Visual Cue Management (VCM) Software, for managing a plurality of unique visible indicia ("Visual Cues" 130) which function much like digital fingerprints and so uniquely identify a particular segment of media programming 120 and a particular media producer, broadcaster, advertiser, marketer or other stake holder (or "Client") for the time and duration or selected interval specified by customer parameters, (b) a Device Application (referred to as an "App") residing on an individual Consumer's transportable smart device 110 (e.g., a smart phone equipped with GPS and a digital camera), (c) a Supervisory Program (SP) stored on a Supervisory Program computer system 200: to manage flow of data to and from external sources—Clients and Consumers—and functions such as a decoding, data parsing, VCM, Database Management System (DBMS), Visual Cue Image Validation, etc., and (d) an Image Validation Program (IVP): to validate that Consumer images have at least one valid Visual Cue 130.

In the method of the present invention, media content such as displayed static images or video or motion picture programming 120 (e.g., an advertisement) is shown or displayed (e.g., on a TV, video display, sign or billboard), and (for TV or Video programming) at a selected start time during the ad or a show, a Visual Cue (VQ) 130 appears for a selected interval in a selected position within the display area. When VQ 130 appears, the Consumer "self selects" or makes a decision about whether to ignore or participate in the method of the present invention.

If Consumer 50 decides to participate, the Consumer activates a previously downloaded Device App on the Consumer's Device or Smartphone 110 and points the Smartphone's camera or image sensor at the display including VQ 130. In response, the Consumer's Device App initiates a set of programs or routines that activate the Smartphone's camera which detects, senses and then records or captures an image or snap-shot of the display or TV screen (while VQ 130 remains visible). The Device app stores the image along with a time and date stamp, preferably with information on the sensed GPS location of the Consumer at the time the image was captured. The Device app collects the stored image data with the VQ data, the time and date stamp, and other Consumer-specific data entered by the Consumer or taken from the Smartphone memory and then organizes or compiles that Consumer-specific data into selected Audience Measurement ("AM") and Audience Participation ("AP") data. The AM and AP data are formatted into an "AM-AP Consumer Input File" adapted for digital transmission over a data communication network such as an Ethernet data communications network, the Worldwide Web or the Internet. As noted above, for purposes of nomenclature, the term "data communications network" should be construed to include (without limitation) wired or wireless telecommunications networks, dedicated (e.g., Ethernet) data communications networks, the Worldwide Web or the Internet.

The Consumer's Smartphone 110 or other portable Device may optionally be connected to a personal computer 150 programmed to transmit the AM-AP Consumer Input File 160 over the Internet via a wired or wireless connection to a remotely located Supervisory Program computer system 200 programmed to receive and store many AM-AP Consumer Input Files from many users simultaneously. The Supervisory Program computer system 200 continuously receives and processes AM-AP Consumer Input Files from a plurality of assigned Consumers, verifies the data in each AM-AP Consumer Input File 160 and collates the data from all assigned Consumers as the AM-AP Consumer Input Files are received. In response to receiving the Consumer's AM-AP Consumer Input Files, the Supervisory Program computer system 200 generates a plurality of reports for use by authorized Consumers and authorized Clients including a Record of Consumer's incentives for each Consumer assigned to a given Supervisory Program computer system and an aggregate report for all of the Consumers assigned to each Supervisory Program computer system. Alternatively, as illustrated in FIG. 3, Supervisory Program computer system 200 is used to interact with the Consumer by sending selected information back to a selected Consumer in response to receipt of the Consumer's AM-AP Consumer Input File(s) 160.

Each Supervisory Program computer system 200 also generates a Record of Consumer's behaviors or selections, and this data is collated for each Consumer assigned to the Supervisory Program computer system along with and an aggregate report for all of the Consumers assigned to that Supervisory Program computer system, for use by authorized Clients and, optionally, by selected authorized Consumers.

The method and system of the present invention is configured for use by a Consumer observing media content in any of several media formats (e.g., whether reading a magazine, seeing a billboard, watching a movie in a cinema, watching TV at home or watching a video streamed wirelessly to a Smartphone). Thus, the media may be displayed using any portable or fixed media format and so the method and system of the present invention tracks each Consumer no matter where, when or how that Consumer receives their media content and provides data for use in estimating AM and AP metrics with a higher degree of confidence.

In an alternative embodiment, there is only a single Supervisory Program computer system 200 and all Consumers are thus "assigned" to or aggregated within that single Supervisory Program's received Input files and reports.

Figure 4:
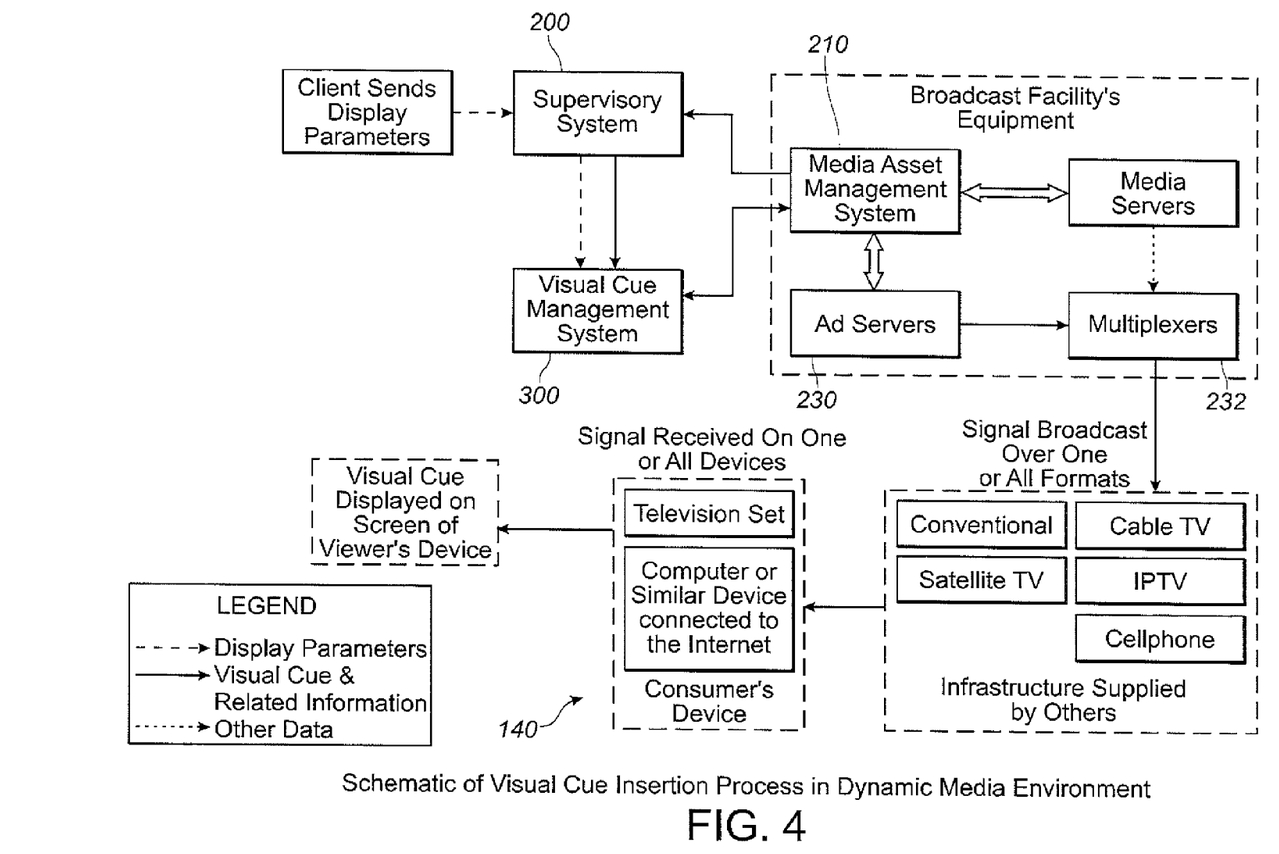
FIG. 4 illustrates a system and method for gathering AM metrics and providing AP data by inserting a Visual Cue in a media format for a dynamic media environment.

Referring now to FIG. 4, Supervisory Program computer system 200 receives a request for one or more Visual Cues from a broadcast facility's Media Asset Management (MAM) system 210. The Supervisory Program computer system 200 transfers the request to the Visual Cue Management (VCM) system 300. The VCM retrieves the correct Visual Cue(s) from storage and releases it to a broadcast facility's MAM for storage in their ad server 230. A Visual Cue 130 is packaged with necessary instructions for how it should be inserted into the broadcast stream. Visual Cue 130 will be released along with the Client's ad, from the broadcast facility's ad server 230, in a predetermined manner—either along with the ad or after a delay—per Client's instructions. The ad and accompanying Visual Cue 130 are inserted into the broadcast stream by equipment generically known in the TV industry as multiplexers 232. The video signal, which now includes the Visual Cue 130, is broadcast via one or more media formats—conventional TV, cable, satellite, online or cellphone. A report detailing the placement of Visual Cue 130 with information such as time, location, information on the ad, etc. is forwarded to the Image Validation Program (IVP) 400 for use as a reference. A clip of the broadcast with the ad and Visual Cue 130 can also be fed back to Supervisory Program computer system 200 to be used as a master by the Image Validation Program (IVP) 400. The Consumer equipment or device 140—TV, video recording device or computer—receives the video signal, processes it and displays the resulting image with Visual Cue 130.

Figure 5:
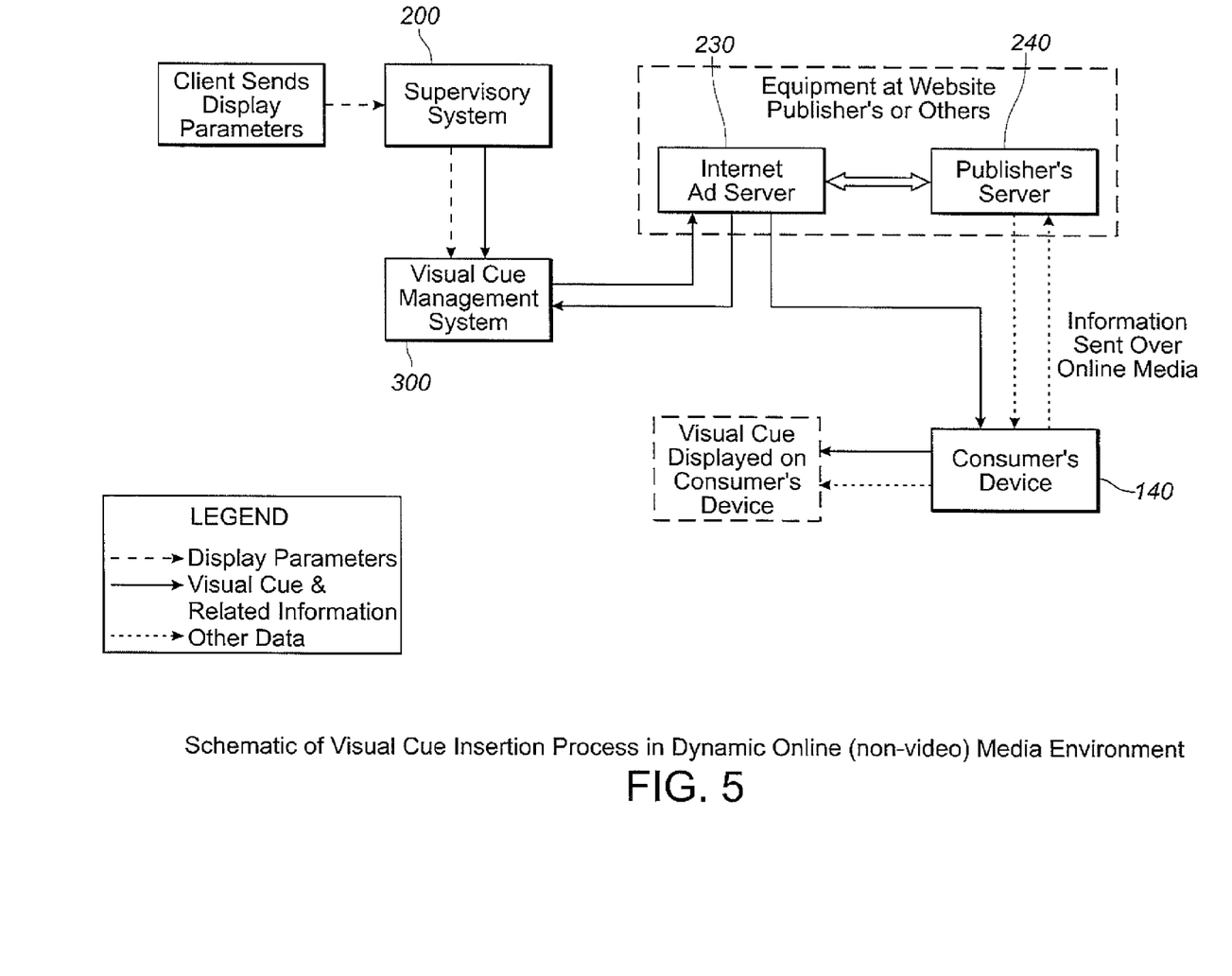
FIG. 5 illustrates a system and method for gathering AM metrics and providing AP data by inserting a Visual Cue in a non-video online media format.

In FIG. 5, Supervisory Program computer system 200 instructs Visual Cue Management (VCM) system 300 on a regular basis to transfer Visual Cue(s) 130 to ad servers 230 where corresponding primary ad is stored. Consumer 50 visits a website while browsing the internet. As the Consumer's device 140 loads a webpage ad serving code on the webpage, which is included in the webpage by website publisher or website owner 240, it requests the nearest ad server for an ad. Based on targeting criteria embedded in the request, the ad server selects the most suitable ad from its inventory and sends it to Consumer 50. Consumer's device 140 receives the information, decodes it and displays the ad on the webpage. If the selected ad is one with Visual Cue 130 of the present invention then Consumer's device 140 would display the requested webpage, the Client's ad and Visual Cue 130. A report detailing the placement of Visual Cue 130 with information such as time, location, information on the ad, etc. is forwarded to the Image Validation Program (IVP) 400 for use as a reference.

Figure 6:
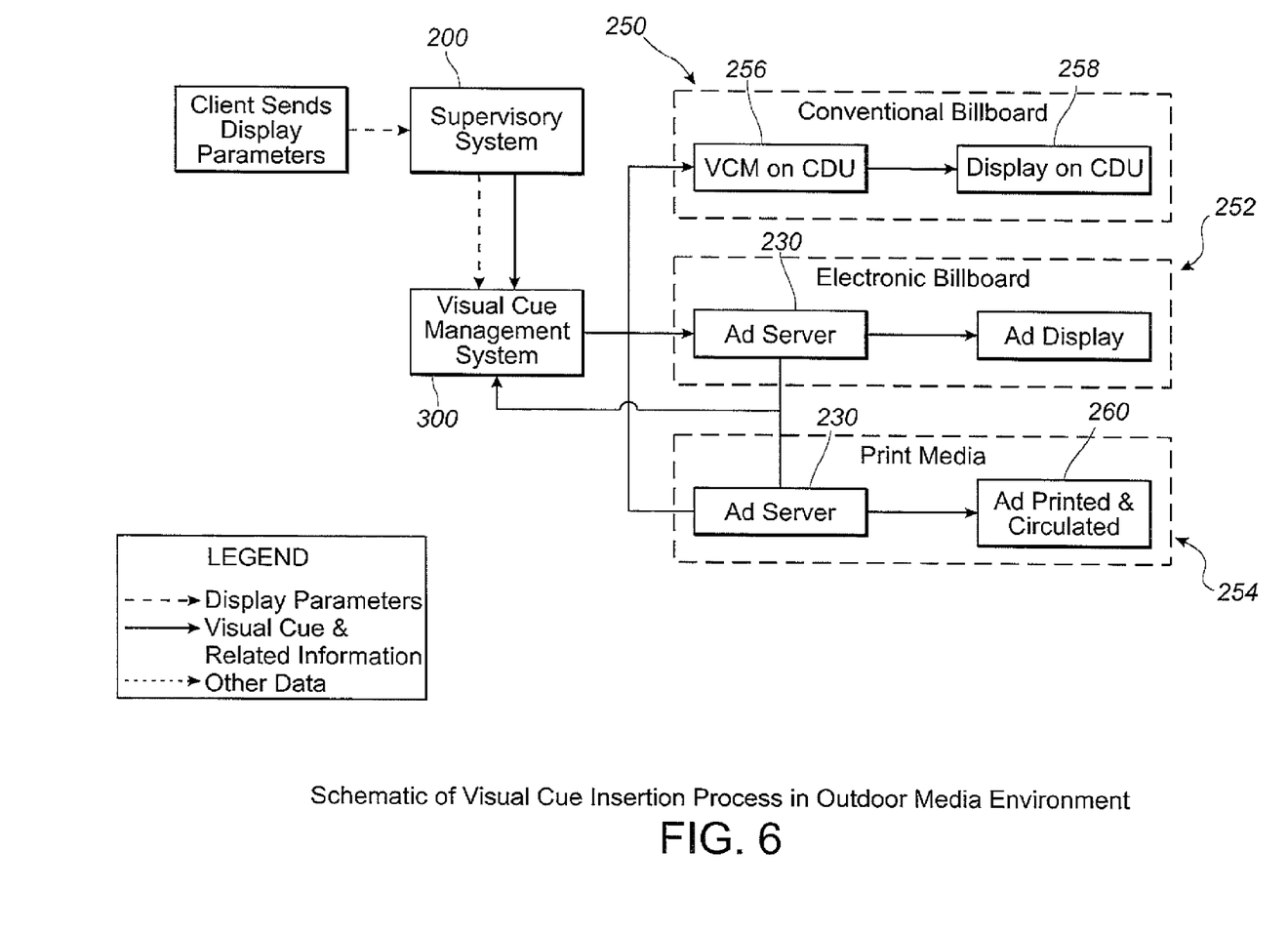
FIG. 6 illustrates a system and method for gathering AM metrics and providing AP data by inserting a Visual Cue in an outdoor media format.

FIG. 6 illustrates a system and method for inserting a Visual Cue Management symbol 130 in an outdoor media format. When an ad on static billboard 250 is changed or a Client requests an update, display parameters are downloaded onto a Cue Display Unit ("CDU"). A CDU is hardware that is mounted onto conventional billboard 250 comprising a display, electronics to power and control the display unit and a standalone version of Visual Cue Management (VCM) software. Based on the display parameters, VCM on the CDU 256 of the billboard sends control signals to the CDU display unit 258 to turn on a specified Visual Cue. The display unit receives the signal and displays the appropriate Visual Cue 130.

For electronic billboards 252, on a regular basis Supervisory Program computer system instructs VCM 300 to transfer Visual Cue 130 to electronic billboard's ad servers 230 where corresponding primary ad is stored. Visual Cue 130 will be released along with the Client's ad, from the billboard's ad server, in a predetermined manner—either along with the ad or after a delay—per Client's instructions. The ad and accompanying Visual Cue 130 are displayed on the electronic billboard 252. A report detailing the placement of the Visual Cue 130 with information such as time, location, information on the ad, etc. is forwarded to the Image Validation Program (IVP) 400 for use as a reference.

For print media 254, on a regular basis Supervisory Program computer system 200 instructs VCM 300 to transfer Visual Cue 130 to ad printer 260 where Client's corresponding ad is sent for printing. Ad printer 260 overlays Visual Cue 130 on Client's corresponding ad and schedules it for printing. The ad with the Visual Cue is printed and circulated in targeted media market.

Figure 7:
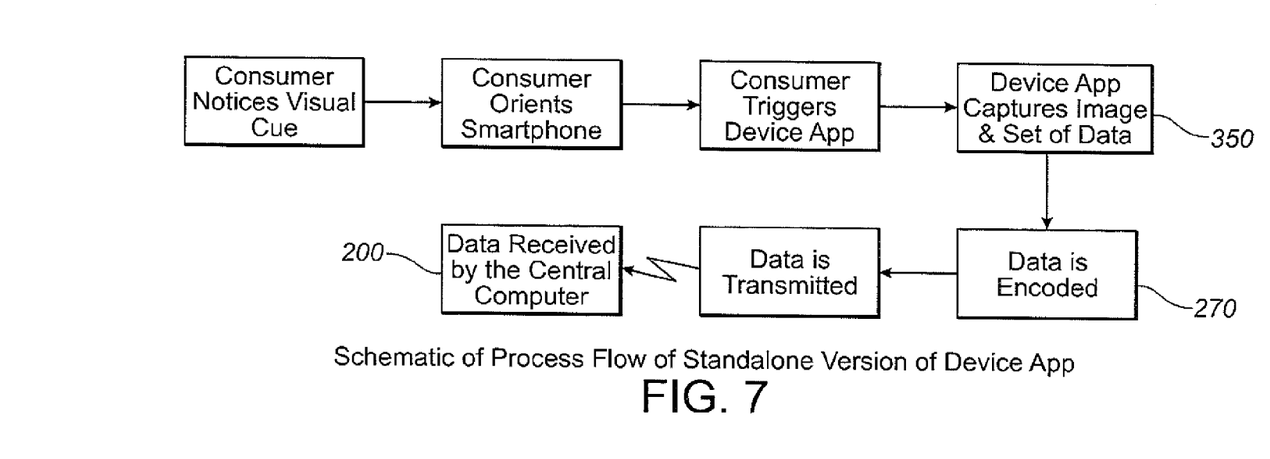
FIG. 7 illustrates a system and method for gathering AM metrics and providing AP data using a smart device and standalone version of Device App.

FIG. 7 illustrates a system and method for gathering AM metrics and providing AP data using a smart device 110 and standalone version of Device App. A Consumer notices Visual Cue 130 appear on media content 120 on the display device—TV screen, computer monitor, cellphone or billboard. Consumer 50 orients smart device 110, with the camera facing media content 120 in an orientation that captures most of the scene, and triggers Device App 350. In addition to capturing the image the App also records other data including: GPS location, date & time, serial number of device and camera settings. Device App 350 encodes and packages the AM & AP data into AM-AP Consumer Input File(s) 270 and transmits it to central computer 200. The transmission could be immediate to facilitate real-time data gathering and/or interactions. In the case where immediate transmission is not possible, Device App 350 would store-and-forward data whenever a connection becomes available.

Figure 8:
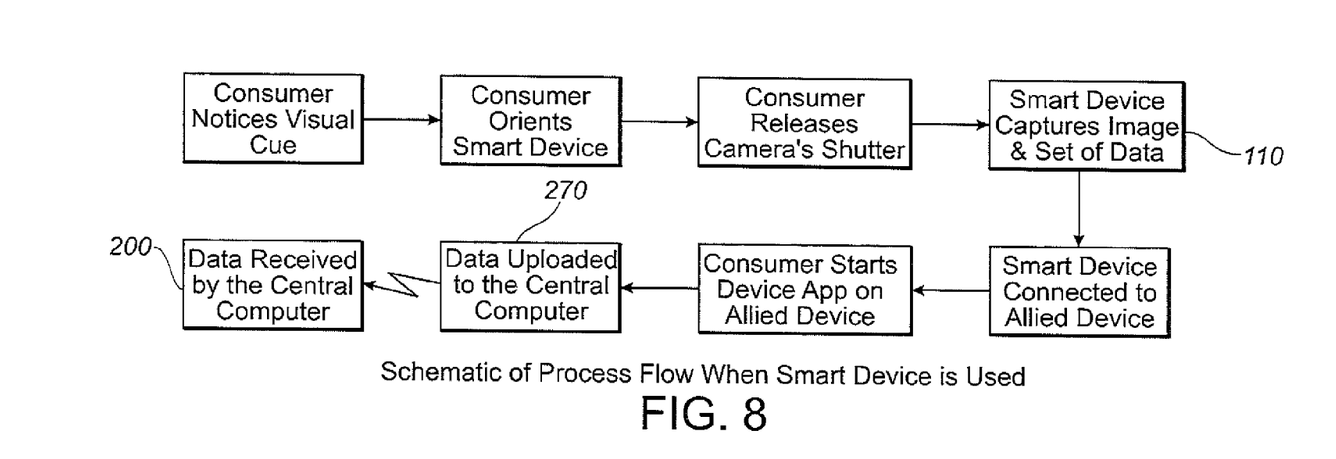
FIG. 8 illustrates a system and method for gathering AM metrics and providing AP data using a smart device with an Allied Device.

FIG. 8 illustrates a system and method for gathering AM metrics and providing AP data using a smart device and an Allied Device. An Allied Device is a separate standalone device that runs the App. Consumer 50 notices Visual Cue 130 appear on media content 120 on the display device—TV screen, computer monitor, cellphone or billboard. Consumer 50 orients the smart device, with the camera facing media content 120 in an orientation that captures most of the scene, and triggers the camera's shutter release button. In addition to capturing the image smart device 110 also records other data including: GPS location, date & time, serial number of device and camera settings. The smart device is then connected to an Allied Device on which a version of Device App 350 is installed. Device App 350 is started and it recognizes smart device 110 that is connected to the Allied device. Consumer 50 logs in to his/her account, selects the image on smart device 110. Device App 350 formats the data into AM-AP Consumer Input File 270 adapted for digital transmission and uploads it to central computer 200.

Figure 9:
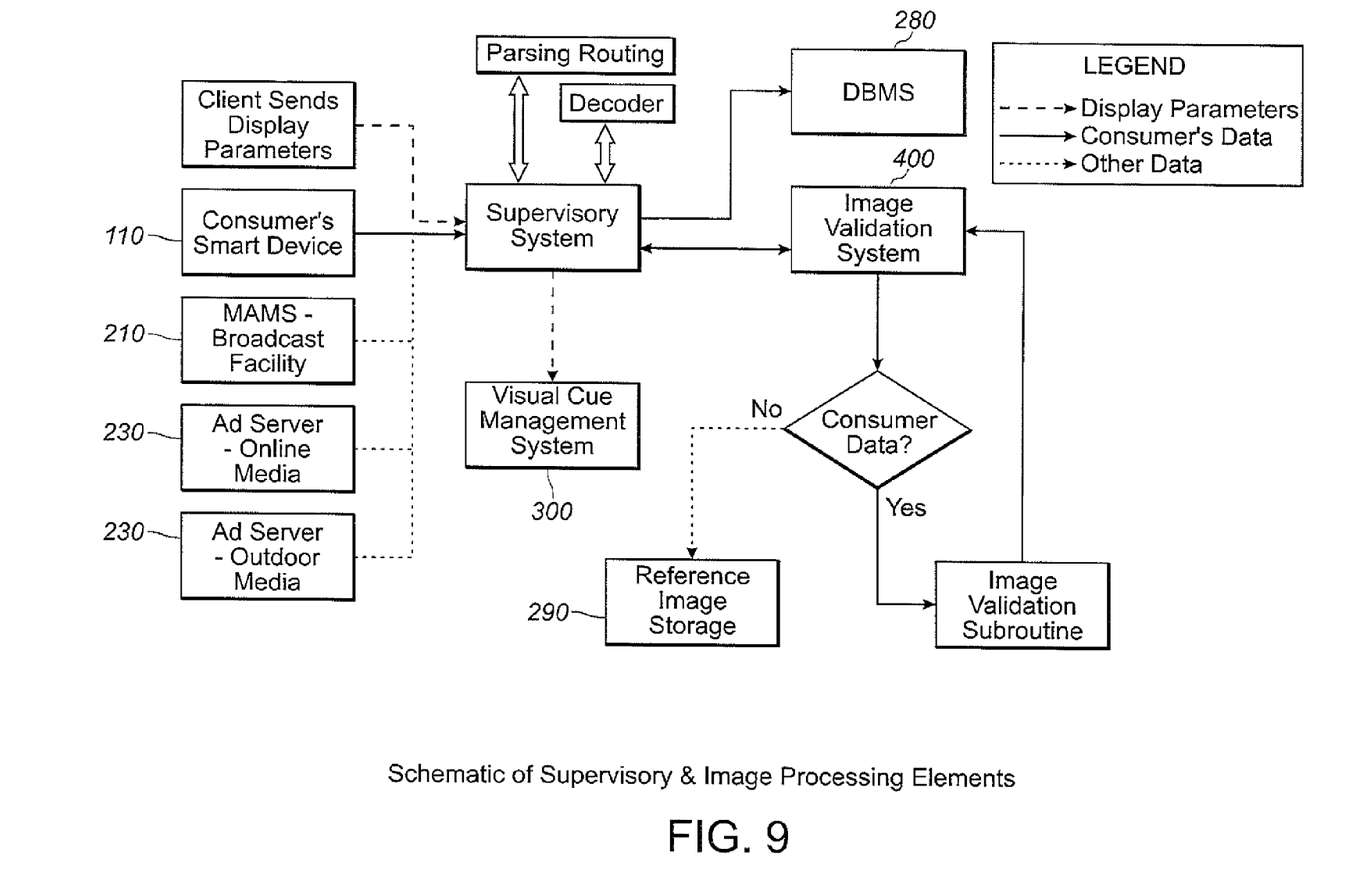
FIG. 9 illustrates a system and method for the processing and handling of data by the Visual Cue Management System, Image Validation System and the Supervisory System.

FIG. 9 illustrates a system and method for the processing and handling of data by the Visual Cue Management system 300, Image Validation Program 400 and Supervisory Program computer system 200. Client's display parameters are entered into Supervisory Program computer system 200. Supervisory Program computer system 200 forwards the display parameters including Visual Cue 130 information to Visual Cue Management system 300 and Image Validation Program 400. Supervisory Program computer system 200 receives feedback information from publishers—broadcast facilities, ad servers and billboard operators—indicating id of Visual Cue 130 inserted, channel number, date and time, channel and IP address of visitor. Supervisory Program computer system 200 forwards the data to a parsing sub-routine to deconstruct the data into its components—image data, location, date and time. Image data along with other information—location, date and time—are forwarded to the Image Validation Program 400. The data bundle or package from the Consumer's smart device is received by Supervisory Program computer system 200 and forwarded to the decoder routine. When decoding is completed Supervisory Program computer system 200 forwards data to parsing sub-routine to deconstruct data into its components—image data, location, date and time, device serial number and camera settings. Image data along with other information—location, date and time, and device serial number are forwarded to Image Validation Program 400 and remaining information is sent to data warehouse to be catalogued by Database Management System (DBMS) 280. Image Validation Program 400 receives the image data and other information such as location, date and time and device serial number from the Supervisory Program computer system 200. Depending on the nature of the image data—reference image or image from Consumer 50—the data is sent to reference image storage 290 or for validation. Image Validation Program 400 sends the validation report back to Supervisory Program computer system 200.

In the preferred embodiment, the present invention is a method for verifiable two-way communication and interaction with audiences using multiple media formats comprising:

(a) obtaining a selected set of customer parameters, said parameters being taken from a list including media of interest, media market of interest, channel of interest, start date, end date, start time, end time, specific time, Selected Visual Cue Display Interval and delay time;

(b) packaging a unique Visual Cue management symbol for said client with customer parameters, said customer parameters provides publishers with instructions and include the format, location, start time and Selected Visual Cue Display Interval;

(c) storing of said symbol by software for management of storage, retrieval and release of said symbol;

(d) releasing and transmitting said symbol and said customer parameter instructions to at least one publisher;

(e) maintaining communication with said publisher to enable and monitor symbol placement in selected media formats in accordance with said customer parameter instructions packaged with said symbol;

(f) displaying said Visual Cue management symbol by said publisher in said selected media formats.

(g) viewing said Visual Cue management symbol by at least one consumer;

(h) capturing at least one image of said symbol with a smart device by said consumer;

(i) packaging of said image with consumer information as a package by software for management, collection and transmission of market audience data, said information being taken from a list including phone number or device number, date, time, location, camera settings and customer survey answers.

(j) transmitting of said package to software for management, collection and transmission of market audience data;

(k) unpacking of said package by software for management, collection and transmission of market audience data;

(l) receiving publisher information from said publishers, said publisher information being taken from a list including symbol identifier, channel of symbol displayed, start time of symbol and stop time of symbol.

(m) validating said image by software for management, collection and transmission of market audience data (n) compiling and reporting the received data when said image is validated by software for management, collection and transmission of market audience data.

(o) sending customer response to said consumer by software for management, collection and transmission of market audience data based on customer parameters.

Having described preferred embodiments of a new and improved method, it is believed that other modifications, variations and changes will be suggested to those skilled in the art in view of the teachings set forth herein. It is therefore to be understood that all such variations, modifications and changes are believed to fall within the scope of the present invention as set forth in the claims.

What is claimed is:

1. A method for verifiable two-way communication and interaction with audiences using multiple media formats comprising:

(a) at a server device, obtaining a selected set of customer parameters, said parameters being taken from a list including media of interest, media market of interest, channel of interest, start date, end date, start time, end time, specific time, Selected Visual Cue Display Interval and delay time;

(b) packaging a unique Visual Cue management symbol for said client that indicates to target customer a cue for customer to interact with said symbol, wherein said symbol comprises customer parameters that provide publishers with instructions and include the format, location, start time and Selected Visual Cue Display Interval;

(c) storing of said symbol by software for management of storage, retrieval and release of said symbol;

(d) releasing and transmitting said symbol and said customer parameter instructions to at least one publisher in real time;

(e) maintaining communication with said publisher to enable and monitor symbol placement in selected media formats in accordance with said customer parameter instructions packaged with said symbol; and (f) displaying said Visual Cue management symbol by said publisher in said selected media formats.

2. The method of claim 1 further comprising: (g) viewing said Visual Cue management symbol by at least one consumer; (h) capturing at least one image of said symbol with a smart device by said consumer; (i) packaging of said image with consumer information as a package by software for management, collection and transmission of market audience data, said information being taken from a list including phone number or device number, date, time, location, camera settings and customer survey answers.

3. The method of claim 2 further comprising: (j) transmitting in real time said package to software for management, collection and transmission of market audience data; (k) unpacking of said package by software for management, collection and transmission of market audience data; (l) receiving publisher information from said publishers, said publisher information being taken from a list including symbol identifier, channel of symbol displayed, start time of symbol and stop time of symbol.

4. The method of claim 3 further comprising: (m) validating said image by software for management, collection and transmission of market audience data (n) compiling and reporting the received data when said image is validated by software for management, collection and transmission of market audience data.

5. The method of claim 4 further comprising: (o) sending in real time customer response to said consumer by software for management, collection and transmission of market audience data based on customer parameters.

* * * * *